United States Patent
Kar et al.

(10) Patent No.: US 6,548,142 B1
(45) Date of Patent: Apr. 15, 2003

(54) SILICA GLASS HONEYCOMB STRUCTURE FROM SILICA SOOT EXTRUSION

(75) Inventors: Gitimoy Kar, Painted Post; Kenneth E. Hrdina, Horseheads; John F. Wight, Jr., Corning; C. Charles Yu, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/506,040

(22) Filed: Feb. 17, 2000

Related U.S. Application Data (60) Provisional application No. 60/120,629, filed on Feb. 18, 1999.

(51) Int. Cl.[7] .................................................. B32B 3/12
(52) U.S. Cl. .................. 428/116; 428/118; 264/630; 264/634; 264/639; 55/522; 55/529; 359/642
(58) Field of Search ................................. 428/116, 118; 264/630, 634, 639; 55/522, 529; 359/642

(56) References Cited

U.S. PATENT DOCUMENTS

| 2,726,487 A | 12/1955 | Cummins et al. ............. 49/78.1 |
| 3,196,193 A | 7/1965 | Davies et al. ................. 264/58 |
| 3,885,977 A | * 5/1975 | Lachman et al. ............. 501/80 |
| 4,010,019 A | 3/1977 | Cole et al. ...................... 65/36 |
| 4,083,728 A | 4/1978 | Orso et al. .................... 106/52 |
| 4,364,760 A | 12/1982 | Higuchi et al. ............... 55/523 |
| 4,446,104 A | 5/1984 | Hammerling et al. ......... 422/63 |
| 4,853,020 A | 8/1989 | Sink ............................. 65/4.1 |
| 5,053,092 A | 10/1991 | Lachman ...................... 156/89 |
| 5,185,110 A | 2/1993 | Hamaguchi et al. .......... 264/44 |
| 5,265,327 A | 11/1993 | Faris et al. .................... 29/825 |
| 5,560,811 A | 10/1996 | Briggs et al. ................ 204/451 |
| 5,602,197 A | 2/1997 | Johnson et al. ............. 524/275 |
| 5,660,778 A | * 8/1997 | Ketcham et al. |
| 5,678,165 A | 10/1997 | Wu .............................. 419/37 |
| 5,750,026 A | 5/1998 | Gadkaree et al. ......... 210/502.1 |
| 5,774,779 A | 6/1998 | Tuchinskiy ..................... 419/2 |
| 6,097,011 A | * 8/2000 | Gadkaree et al. |

FOREIGN PATENT DOCUMENTS

| DE | 196 28 928 A1 | 7/1996 |
| JP | 63199432 | 8/1988 |
| JP | 6-327967 A | 11/1994 |

OTHER PUBLICATIONS

"amorphous solid" *Encyclopedia Britannica Online*, 1994–2001 Encyclopedia Britannica, Inc.*

* cited by examiner

*Primary Examiner*—Deborah Jones
*Assistant Examiner*—Wendy Boss
(74) *Attorney, Agent, or Firm*—Patrick Pacella; Timothy M. Schaeberle (57) ABSTRACT

The present invention describes a glass honeycomb structure having a variety of shapes and sizes depending on its ultimate application. Unlike prior art honeycomb structures made from ceramics, the inventive glass honeycomb can be readily bent and/or redrawn. Furthermore, the inventive honeycomb structure is lightweight, yet able to support heavy loads on its end faces. Therefore, the inventive honeycomb can be used as a light-weight support for such objects as mirrors. Other useful properties of the extruded glass honeycomb are its high softening temperature, its transparency to ultraviolet and visible light, and its ability to be redrawn. Embodiments that rely upon one or more of these properties include: a bio-reactor, a membrane reactor, a capillary flow controller, a high efficiency filtration system, in-situ water treatment, high temperature dielectric material, and photonic band gap material.

28 Claims, 9 Drawing Sheets

SILICA GLASS HONEYCOMB STRUCTURE FROM SILICA SOOT EXTRUSION

This application claims the benefit of U.S. Provisional Application Ser. No. 60/120,629, filed Feb. 18, 1999 entitled Silica Glass Honeycomb Structure From Silica Soot Extrusion, by C. Charles Yu, John F. Wight, Gitimoy Kar and Kenneth E. Hrdina

FIELD OF THE INVENTION

This invention relates to vitreous honeycomb structures and, more particularly, high purity vitreous honeycomb structures derived from silica soot using an extrusion process. These structures can be used in varied applications by themselves or as preforms for consecutive processes such as viscous reforming operations.

RELATED APPLICATIONS

This application is related to the following, commonly assigned, co-pending United States patent applications: U.S. Ser. No. 09/211,379 (attorney docket St. Julien 15) filed Dec. 19, 1997 by D. St. Julien et al. entitled MANUFACTURE OF CELLULAR HONEYCOMB STRUCTURES; U.S. application Ser. No. 09/299,766 filed Apr. 26, 1999 by Borrelli et al. entitled Redrawn Capillary Imaging Reservoir; and U.S. Ser. No. 09/360,672, filed Jul. 30 1998 by Borrelli et al. entitled METHOD OF FABRICATING PHOTONIC STRUCTURES; and U.S. application Ser. No. 09/300,121 filed Apr. 27, 1999 by Borrelli et al. entitled REDRAWN CAPILLARY IMAGING RESERVOIR.

BACKGROUND OF THE INVENTION

While common structures made of glass have become inseparable from our daily lives, the unique properties of glass also allow its use in complex structures for high-technology specialty applications. Honeycomb structures comprising glass belong in the latter category. Glass honeycomb can be made with an array of channels and indeed have been made by other processes usually requiring fusing many individual glass tubes together. Structures made in such a manner are typically limited in channel diameter and homogeneity due to the fusing process. Structures of this type have also been made of other materials, but glass offers a combination of unique properties that allow such a structure to be hot drawn down and used in novel applications and technologies, especially where high surface area is required. An example of such a utility would be to facilitate or catalyze chemical reactions. Additional benefits derive from the high purity and/or high clarity and transparency that can be obtained from a glass honeycomb article. A honeycomb structure composed of glass is, therefore, an ideal article for supporting reactions requiring the initiation by actinic light.

Furthermore, because of the cell-like structure, glass honeycomb structure is extremely strong along the channel axis and yet is significantly lighter in weight than solid bulk glass. It is thus ideal for use as a support for such items as mirrors and the like by forming a sandwich construction (ref. CELLULAR SOLIDS, STRUCTURES, AND PROPERTIES, 2nd ed., Lorna J. Gibson and Michael F. Ashby, 1997). Glass honeycomb materials can have a significant benefit where weight is an issue as, for example, extraterrestrial payload. In one example, it is especially beneficial for supporting the reflecting surface of a mirror. The honeycomb support material additionally can be of similar low thermal expansion coefficient to the mirror material in order to prevent distortion or breakage due to thermal stress.

Silica soot is a by-product of the high purity fused silica glass making process. Until now, it has been considered a waste material that is typically discarded even though it is essentially pure silicon dioxide. The increasing demand for high purity fused silica exacerbates this waste problem. Therefore, there is a strong desire to reduce this wastestream both from an ecological as well as a financial perspective. Most advantageous would be to find a productive, commercial application for the material.

Prior Art

Conventional processes have been used to create glass honeycomb structures, but these differ considerably from the inventive process. The prior art approaches to manufacturing this type of glass honeycomb article are either to fuse individual hollow fibers or tubes together or to machine out a solid piece of glass to form a multi-channelled article.

These prior art processes are problematic for several reasons. Firstly, it is difficult to fuse multiple hollow fibers (i.e., fine capillary tubes) to form a multi-channelled article which can then optionally be hot-drawn down and rebundled again and again into a progressively finer and finer array of hollow channels. Secondly, it is difficult to assemble and fuse multiple hollow tubes uniformly into a perfect honeycomb structure. Thirdly, the diameter of the individual hollow fibers that can be easily handled limits the number of tubes in the first bundle towards making the honeycomb structure, because there is a practical limit to the diameter of the assembly that can be uniformly hot-drawn down. Lastly, it is extremely expensive and time consuming to machine a multitude of deep channels into a glass object.

Ceramic honeycomb structures such as Celcor® (a cordierite honeycomb structure used commercially as a substrate for automotive catalytic converters) and glass-ceramic mixtures have been paste-extruded from particulate material, but the resulting honeycomb article is not transparent to light, significantly reducing its utility. In addition, such honeycomb article is crystalline in nature, preventing it from post forming process such as hot-drawn down. Further, the particle size of the raw material used in the Celcor® process is approximately two orders of magnitude larger than the soot used in the present invention. The particle size can significantly affect the minimum web thickness for an extrudable honeycomb structure by direct extrusion.

It is therefore an objective of the present invention to provide a commercial application for high purity silica soot.

It is therefore another objective of the present invention to provide a commercial application for silica soot.

It is another object of the invention to provide a paste-extrusion and sintering process for the conversion of the silica soot into a glass article.

It is further an object of the invention to provide a glass honeycomb structure having high optical clarity and/or high UV transmission, coupled with good mechanical strength, and excellent thermal stability.

It is yet another object of the invention to utilize a glass honeycomb structure in such technologies as filtration, water purification, membrane reactors, flow controllers, bioreactors, structural dielectric, and structural supports.

SUMMARY OF THE INVENTION

The current invention is designed to address the above-mentioned objects and prior art deficiencies. In particular, a process is disclosed for converting a silica containing vitreous powder, specifically a high purity fused silica (HPFS®) or a doped silica soot, into a glass honeycomb article. This is the first known process utilizing fused silica soot to generate such articles which themselves possess unique and advantageous properties.

Glass honeycomb structures can be made by adapting the conventional practice of honeycomb paste-extrusion to using vitreous powder as the starting material. Of special interest is the high silica content glass honeycomb structures made of high purity fused silica soot, and soot derived from silica and other metals, for example silica soot containing up to 9% titanium. High purity silica is defined as essentially pure silicon dioxide, trace materials may be present due to specific process or isolation techniques but these trace materials are considered contaminants adding no beneficial properties to the pure silicon dioxide.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components will bear the same designations and numbering throughout the figures.

Figure 1:
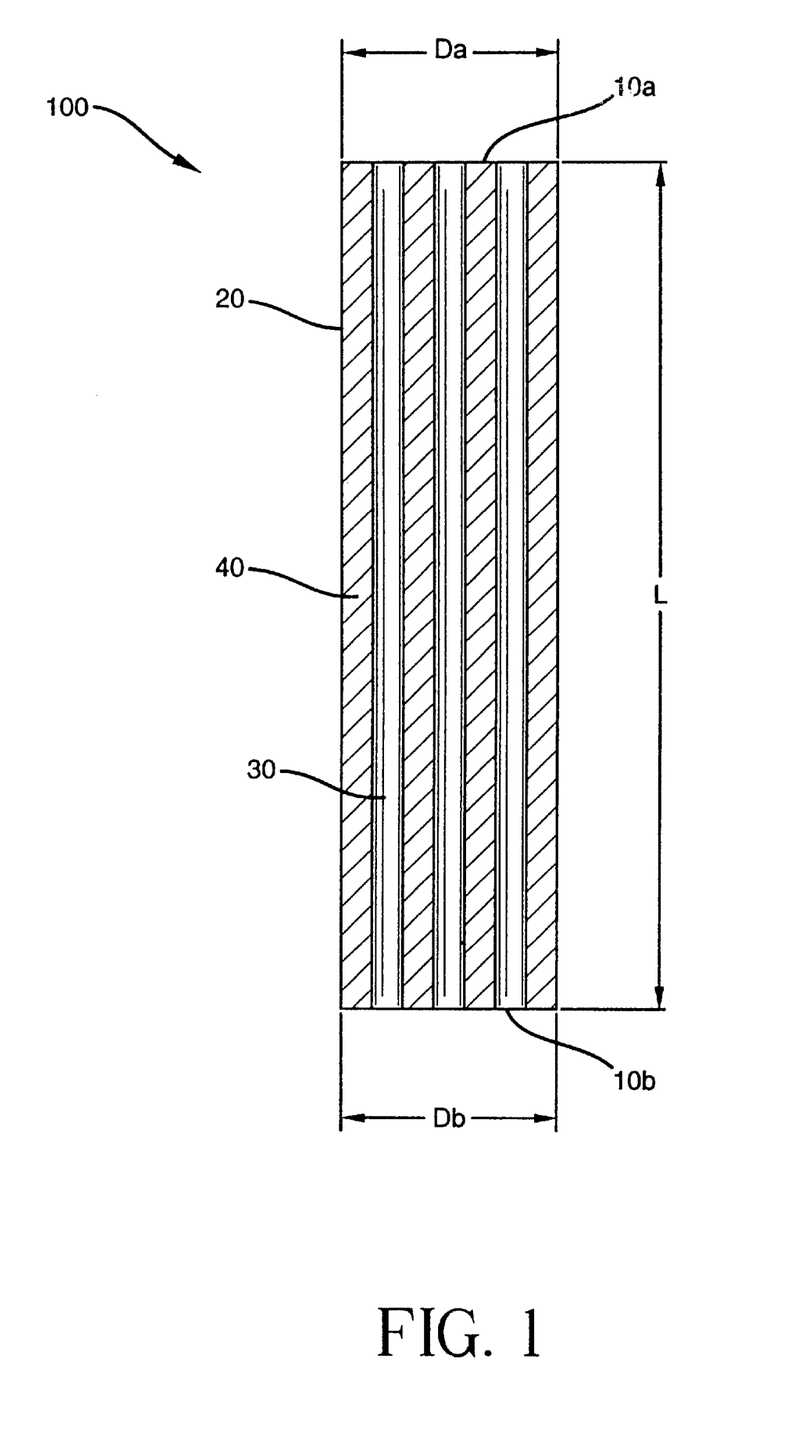
FIG. 1 schematically illustrates a side cross-sectional view of a glass honeycomb article in accordance with the present invention.
Figure 2:
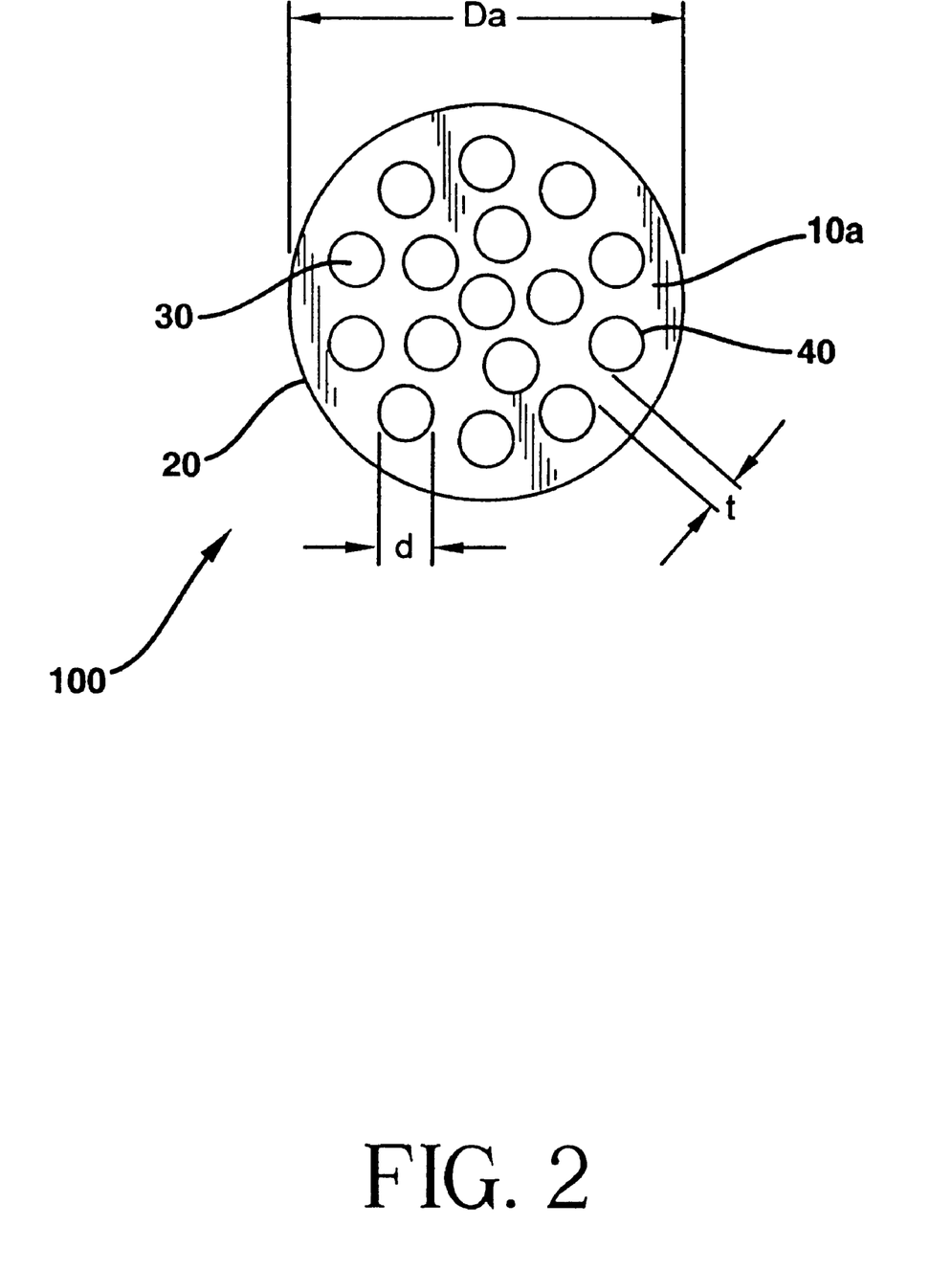
FIG. 2 schematically illustrates a top view of the frontal end of a glass honeycomb article in accordance with the present invention.
Figure 3A:
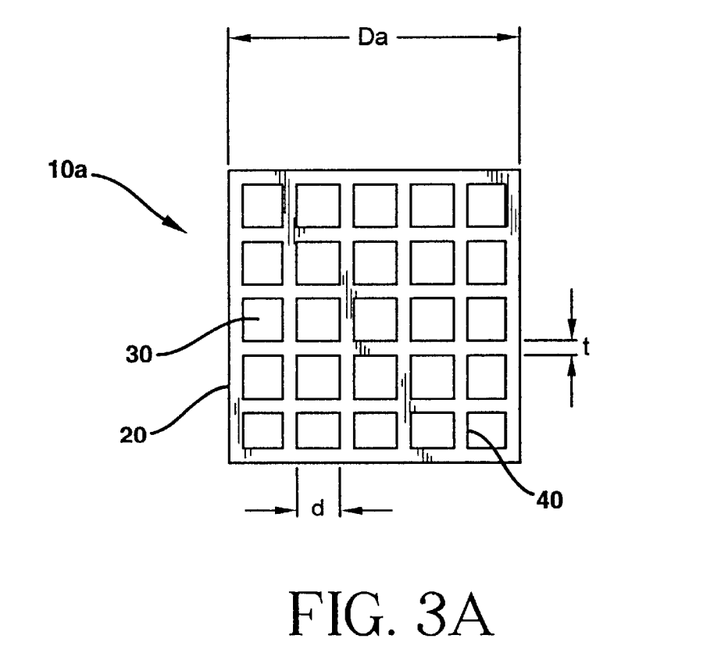
FIGS. 3a–3d schematically illustrate top views of four frontal ends of a glass honeycomb articles to depict preferred cross-sectional channel shapes.
Figure 3B:
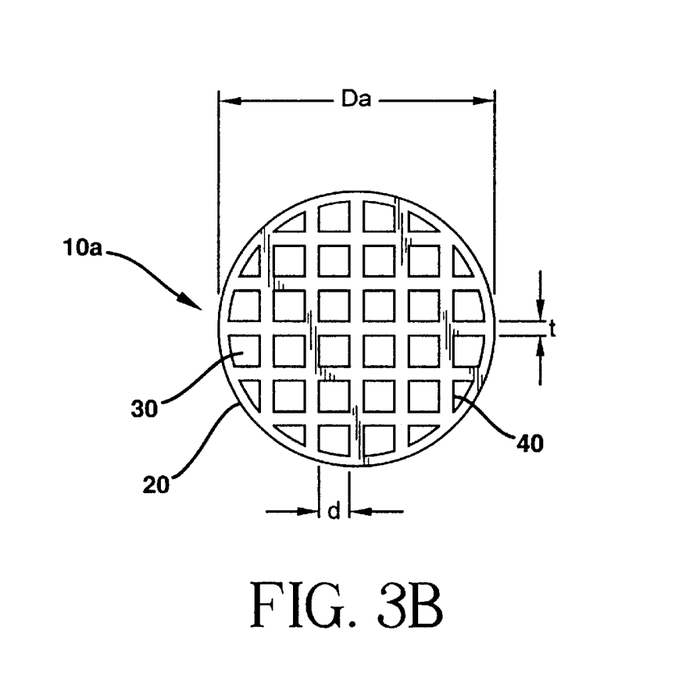
Figure 3C:
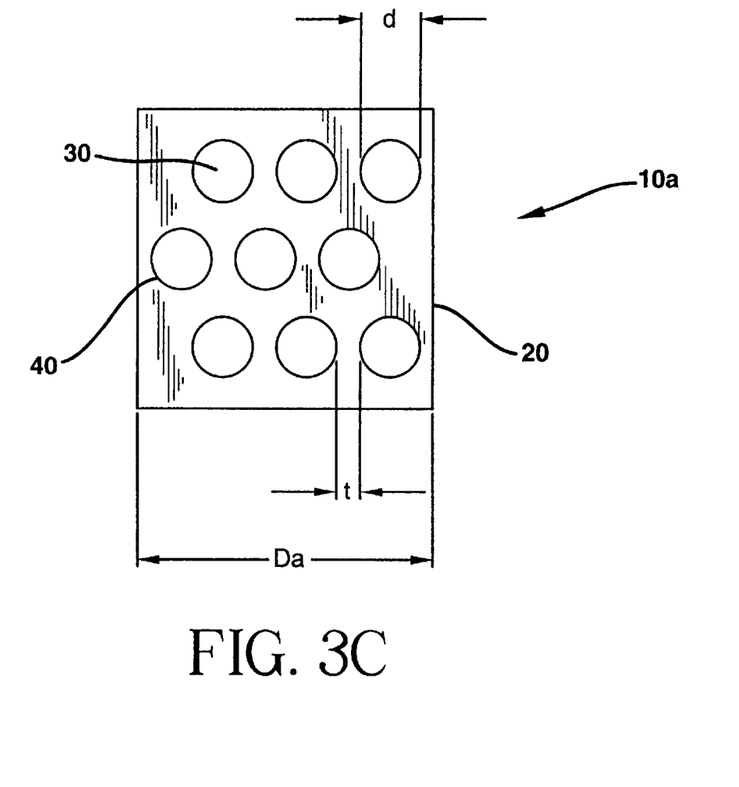
Figure 3D:
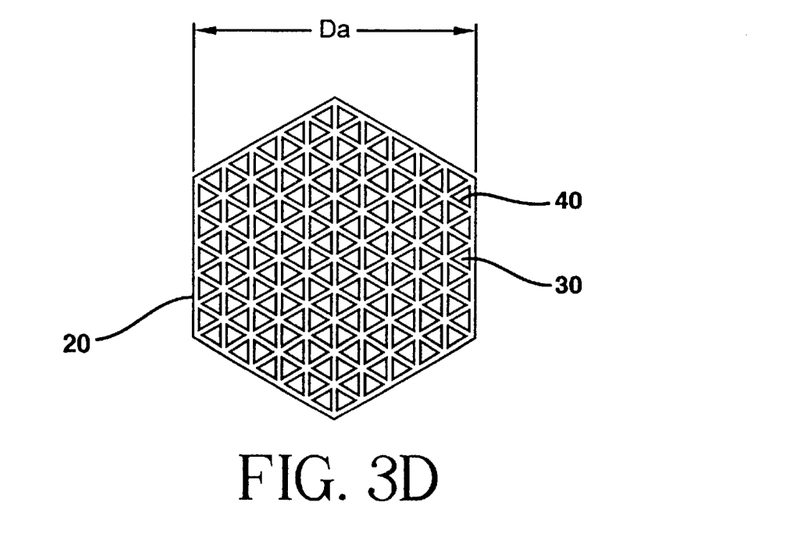
Figure 4:
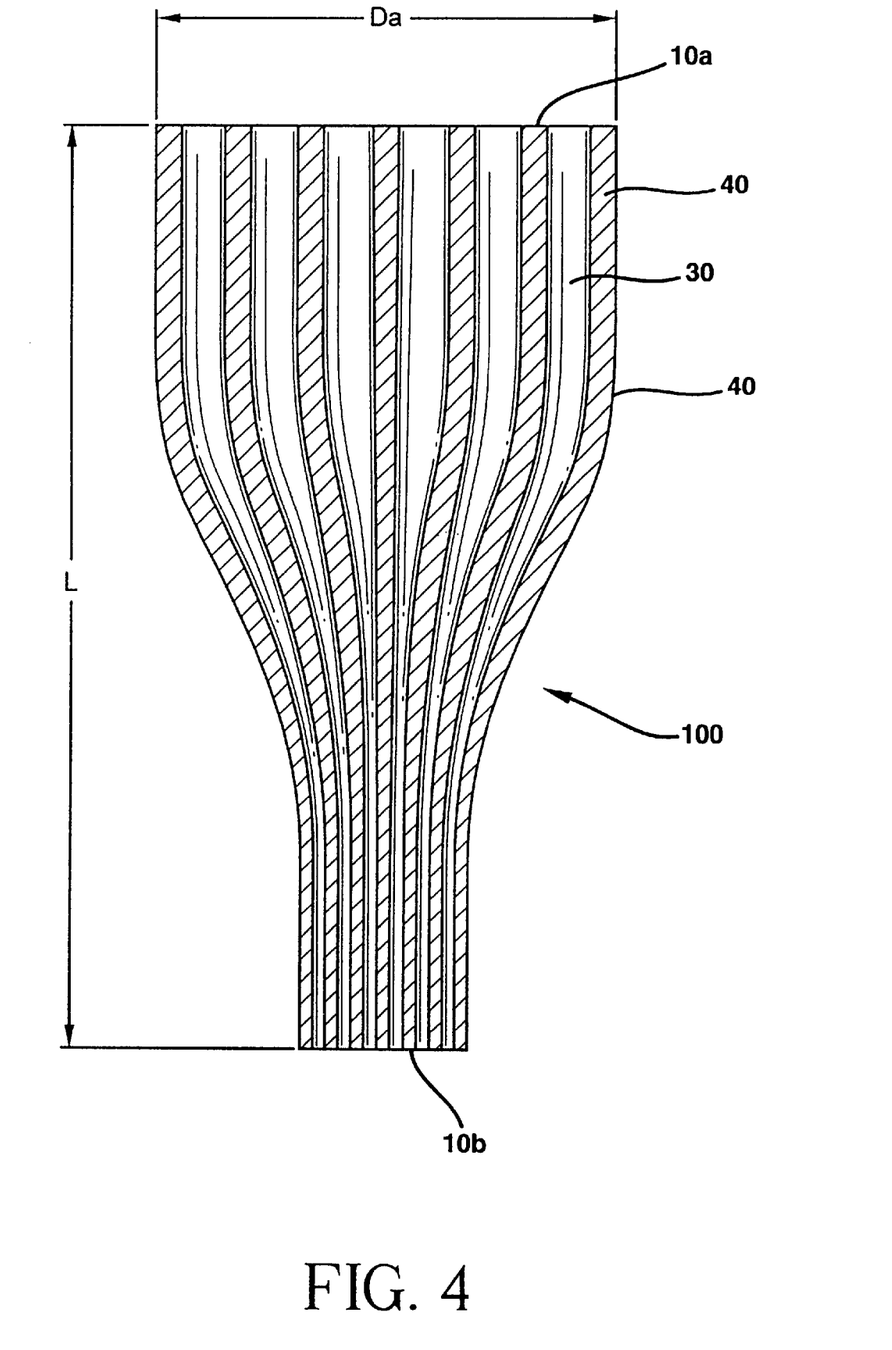
FIG. 4 schematically illustrates a side cross-sectional view of a glass honeycomb article in accordance with the present invention, the lower portion of which has been redrawn.

By way of definition, the term "honeycomb structure" as used in the specification, describes an extruded glass article 100 having two opposing faces 10a and 10b, outer longitudinal surface 20 of length L, and a matrix of cell walls 40 defining an array of channels, cells or through-holes 30, wherein each opposing face has a corresponding cross-sectional surface area and average cross-sectional diameter ($D_a$ and $D_b$ respectively), and each channel traverses, along a longitudinal axis, from the first face 10a to the second face 110b. The opposing faces may have identical cross-sectional surface areas in which case the channels will traverse the honeycomb article parallel to each other. The channels may be disposed randomly or at a fixed distance from each other. This distance is defined by the cell wall thickness, t. The channels also will have a cross-sectional shape and size defined by the cell wall. All closed shapes (e.g. circles, ellipses, triangles, squares, rectangles, hexagons) are allowed. The individual channels can be of all the same shape or mixtures thereof. The cross-sectional size, d, of the channel can be either fixed for all channels or vary within the honeycomb article. The honeycomb article itself can be in a linear design, in which case the first and second opposing faces are parallel to each other, or bent along the longitudinal axis.

DETAILED DESCRIPTION OF THE INVENTION

The extrusion process as designed for this invention is similar to that used to make Cordierite Celcor™, for examples see U.S. Pat. Nos. 3,790,654 (Bagley), 3,905,743 (Bagley), 4,551,295 (Gardner et al.), 4,902,216 (Cunningham), and 5,602,197 (Johnson et al.). To avoid repetition, these publicly available documents are incorporated herein in their entirety and reference is made thereto. Except as otherwise indicated hereinafter, the present invention does not contemplate any substantial change in previously disclosed methods of these documents.

Unlike other production processes, the formation of high purity fused silica (HPFS®) soot is generated by a unique flame hydrolysis or flame combustion process under specifically designed environmental conditions. High purity silicon containing chemical is introduced into an oxygen-hydrocarbon, or oxygen-hydrogen flame, to generate silica intermediates in an insulated enclosure which is maintained at temperatures above 1600° C. The silica intermediates include "seeds" of solid silicon dioxide in the nanometer size range, gaseous silicon monoxide, and other intermediate silicon containing compounds from the flame hydrolysis or flame combustion reactions. The insulating enclosure is designed in such a way that the silica intermediates experience prolonged residence time under high temperature (>1600° C.) within the enclosure, during which the solid silicon dioxide "seeds" grow and sinter simultaneously to generate larger particles before exiting the enclosure.

In this regard, silica soot possesses several unique properties that make it a potentially useful raw material. For example, silica soot comprises high purity, dense, spherical particles having a diameter between about 0.05 and 0.4 micron with an average size of about 0.2 micron. Titanium containing silica soot is a by-product of the ultra low expansion (ULE™) glass making process. It has similar characteristics to high purity fused silica soot except for its composition. Both soot powders have a broad particle size distribution conducive for high particle packing efficiency. Packing efficiencies up to 80% are possible but practical limitations, especially during the extrusion process, limit the upper value. Preferred values for packing efficiency are between about 45% and 70%, and most preferred 65%.

One of the differences between the present invention and prior art processes is that silica glass soot is used as the starting particulate and that low-sodium containing processing additives are desirable in the present invention for applications pertinent to UV transmission. For example, stearic acid and/or oleic acid are preferred to sodium stearate as a lubricant for a soot derived paste formulation. Elvanol® has less sodium ash than Methocel®, and therefore is more desirable. However, chemical cleaning of the extrudate before its final sintering will significantly reduce sodium to the degree that the extrudate is purer than the starting powder.

Another difference between the present invention and prior art processes is that the solids loading of the soot paste is 60 to 63 volume percent (volume of the soot divided by the volume of the paste×100%), which is a higher loading than the standard 50 volume percent solids loading of the paste for making cordierite Celcor™. This is attributed to the soot particle's essentially spherical shape and its size distribution.

Two example recipes, one using Methocele and the other using Evanol® as a binder, for making the glass honeycomb structures are given below. Both batches can be ram extruded (3.5" diameter barrel) through a 1" diameter 400/8 Celcor® die (a die for extruding a square channel grid-array with 400 channels per square inch and a channel wall thickness of 0.008 inches). For further details, refer to Bagley, U.S. Pat. No. 3,790,654 and Cunningham, U.S. Pat. No. 4,902,216. For other diameters and for auger extruders, the water level in the formulations below can be adjusted accordingly.

| Paste of Formula 1: | |
| --- | --- |
| Silica soot | 1000.0 gm |
| Dow Methocel ® F40M | 31.8 gm |
| Stearic Acid (fine powder) | 4.0 gm |
| Deionized water | 275.0 gm |

| Paste of Formula 2: | |
| --- | --- |
| Silica soot | 1000.0 gm |
| DuPont Evanol ® 50-42 | 28.7 gm |
| Stearic Acid (fine powder) | 3.7 gm |
| Deionized water | 254.1 gm |

Formulae 1 and 2 use deionized water as the solvent to prepare the starting paste. However, also useful in the present invention are aqueous organic solvent mixtures. Suitable organic solvents are the lower alcohols, ketones, amides, and esters. These solvents must be sufficiently soluble in water to provide a homogeneous mixture. The ratio of water to solvent can vary from 95:5 to 5:95. Most preferred solvents are ethanol, acetone, methyl ethyl ketone, N,N-dimethylformarnide, and ethyl acetate (see U.S. Pat. No. 5,458,834, Faber et al.).

For the Methocel® recipe, the dry ingredients are turbomixed together. Water is then added as the powder mix is mulled to form a paste. For the Evanol® recipe, a hot polymer solution is made by adding the polymer and the stearic acid to the hot water. This is cooled and added to the soot during mulling. The discharged chunks are spaghettied three times. The rubbery paste spaghetti is then pushed through a 400/8 Celcor® die (refer to U.S. Pat. Nos. 3,790,654 and 4,902,216 disclosed hereinabove) with an 8 mil shim gap and a knife-edged mask. The extruded honeycomb structure is first dielectrically dried to generate greenware, and then debinded with up to a two day burnout with a maximum temperature of 900° C. to generate the brownware. Brownware is unsintered debinded greenware. The following is a typical debinding (pyrolysis) schedule to generate the brownware from the greenware piece:

20–200° C.@50° C./hr
200–600° C.@20° C./hr
600–900° C.@50° C./hr
900° C. for a six hour hold
900–600° C.@50° C./hr cooling
600–20° C.@ cooling without power.

Sintering initiates at the final stage of debinding, when the temperature exceeds 850° C. As a result, the honeycomb structure after debinding has enough mechanical strength to be handled for subsequent treatment.

When high purity fused silica (HPFS®) soot is used as a raw material, the optional step of chemical cleaning is performed. In this step, intermediary brownware article is heated to a temperature between 850° and 1300° C. for a period greater than about 20 minutes in a chlorine or fluorine containing atmosphere for removing beta-OH and trace contaminants of alkali (e.g., sodium), and alkaline earth elements and iron from die wear. When such chemical cleaning is desired, it is performed prior to the sintering step.

The soot honeycomb substrates can be sintered to various degrees to obtain structures that range from open porosity to optical clarity. The sintered glass honeycomb can also be viscously formed into a variety of shapes, examples of which are disclosed in the supra, (U.S. patent application Ser. No. 09/360,672 for the first glass Celcor fiber 09/299, 766 and 09/300,121 for the first glass Celcor funnel) commonly-held pending patent applications.

Transparent HPFS® honeycomb structures have been obtained by heat treating the brownware piece to temperatures up to 1760° C. in a vacuum. A typical firing schedule to sinter the glass structure follows:

a) load specimen into furnace; draw a vacuum at room temperature,
b) heat furnace at about a 50° C./minute rate to 1000° C.,
c) hold at 1000° C. for 5–15 minutes,
d) increase temperature at 10–15° C./minute to 1650° C.,
e) increase temperature at 2° C./minute to 1760° C.,
f) hold at 1760° C. for 5–15 minutes,
g) backfill furnace with argon gas, and
h) cut off power to furnace and allow article to cool at furnace rate to room temperature.

The vacuum firing procedure given above is for the purpose of an illustrating example. The firing can also be carried out effectively under air or inert gas atmosphere such as nitrogen, helium, argon, carbon dioxide, forming gas, and the like, and mixtures thereof. The gas atmosphere can be applied at less than, but preferably equal to, or greater than ambient pressure. Different heating rates and isothermal holding times will be employed when gas atmospheres are employed. The determination of the appropriate conditions is readily determined by experimentation but not excessive experimentation.

Although it is preferred that the glass honeycomb article produced by the above inventive process be transparent, it is within the scope of this invention that the article can also be translucent or opaque. Furthermore, the glass honeycomb article can either be colorless or have a colored tint. Coloration can be achieved by incorporating trace amounts of known glass metal oxide dopants such as cobalt oxide, nickel oxide, or the like.

The glass articles derived from the extruding process using silica soot as a starting material possess unique characteristics and properties compared to alternative processes. As mentioned supra, glass honeycomb structures can be made by fusing together individual tubes of glass. This crude process is both cumbersome and difficult to control in terms of product uniformity. Furthermore, it is very much limited to the diameter range for the individual channels. Below certain sizes, the process becomes untenable.

Glass honeycomb can also be made from an extrusion process using ground glass powder as a starting material (see for example, U.S. patent application Ser. Nos. 09/360,672 and 09/300,121 supra). In these situations, some of the disadvantages of the fusing process are alleviated but other problems still remain. Specifically, problems of uniformity are greatly diminished compared to the fusing process. However, the powders are typically on the order of 5~50 micron in diameter. The impact of particle size is its relationship to thickness of channel walls within the honeycomb. For good extrudability and mechanical strength, cell walls are typically at least 5 to 10 particles in thickness. Therefore, the larger the particle size, the greater the minimum thickness of the cell wall. Since, in the present invention particle size is on the order of 10 to 100 times smaller than the particle size used in conventional glass powders, glass articles with correspondingly thinner walls are extrudable achievable by the present invention. Conventional glass powder has contamination from the melt tank refractories and grinding media. These stones do not melt or draw down. And, their size limits the extent to which web wall thicks can be drawn down. Soot does not have "stones".

As will be seen hereinbelow, wall thickness is directly related to open frontal area (OFA) which essentially is the ratio of channel cross-sectional area to total honeycomb cross-sectional area. The thinner the wall thickness, the higher the OFA and therefore the lighter the weight of the honeycomb. The weight to volume ratio of the honeycomb article is significant when the glass honeycomb is being considered for use as a light weight support.

Wall thickness is also an important parameter for applications involving diffusion of materials through cell walls. Where this characteristic is desirable, such as high efficiency filtration systems or membrane reactors, the greater the diffusion rate, the more efficient the respective process. The thinner cell walls of the current invention assist in designing superior articles of this type. The present inventive formulation and process can extrude glass honeycomb greenware (prior to hot draw or sintering) with channel walls of a minimum of about 10 micron, a preferred minimum of about 40 micron, and a most preferred minimum of about 100 micron.

Furthermore, high purity fused silica, and the soot byproduct used in the present invention, offer a significant advantage over the powder silicates used in alternative, powder processes. The high purity fused silica of the present invention is of such purity, having extremely low levels of alkali and alkaline metals, iron and copper (e.g., below 50–100 ppm), that very high UV transmission is obtained. For applications involving absorption of actinic radiation, specifically ultraviolet radiation, this characteristic is extremely useful. Examples of such applications include, bio-reactors, and in-situ water purification.

High purity fused silica soot, as used in the current invention, also provides another significant advantage over other materials, namely; a high softening point which is typically greater than 1100° C. This allows honeycomb devices made from this material to be used in high temperature applications.

The soot can be further composed of glass-forming metal oxides (i.e. Pyrex@), including but not limited to, aluminum oxide, phosphorous oxide, boron oxide. Preferably the amount of such metal oxides is below 50%, the remainder being silicon dioxide. Where other properties of the honeycomb are desired dopants can also be employed in the soot, for instance, dopants to modify refractive index (e.g. lead oxide) or to impart color (e.g. cobalt oxide) can be used in percentages up to about 10%.

In one embodiment of the invention, the extruded glass honeycomb article can optionally be further processed to narrow the overall cross-section of the article. This can be performed by any process that viscously draws down the article in a longitudinal direction. Typically, this is performed by redrawing the article in a heated environment to a temperature high enough to lower the viscosity of the glass to a point that the glass honeycomb article is soft enough to be viscously drawn down. In this manner the individual channel cross-sections are reduced in size (see U.S. patent application Ser. No. 09/300,121 to Borrelli). For HPFS® honeycomb structures, the temperature required to render the redrawn feasible is in the range above 1800° C.

Figure 5:
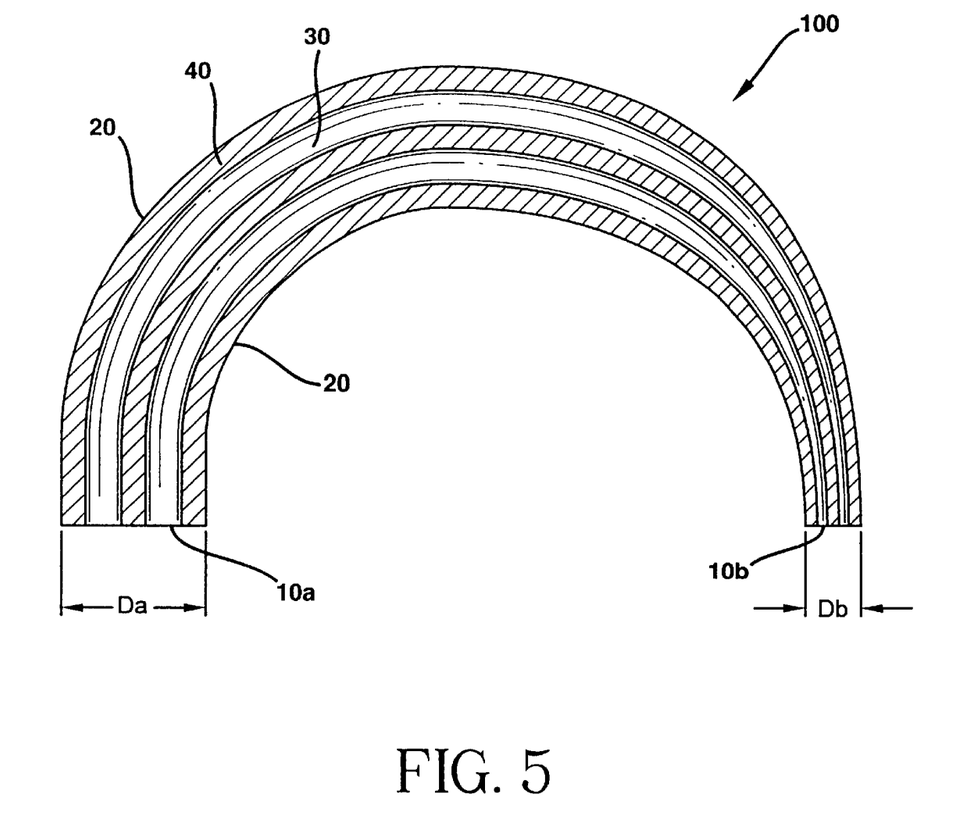
FIG. 5 schematically illustrates a glass honeycomb article in a U-shaped configuration with one end of the article having a constricted opening.

In another embodiment of the invention, elongation is performed only to one end of the article, thereby producing one constricted end having narrowed channel cross-sections. An article of this type can be used to simultaneously supply the same or multiple solutions to a very small receptive area. Solutions can be provided continually or intermittently as required by the specific application.

In other embodiments of the invention, the glass honeycomb article may be linear along its longitudinal axis or it may be curved. In one preferred embodiment, the longitudinal axis is curved into a U-shaped article. The ends of the U-shaped article can be either the same or different cross-sectional areas depending if the article is also redrawn.

In still another embodiment of the invention, the glass honeycomb article can be redrawn while torsional forces are being applied. This produces a twisting of the channels around the longitudinal axis and provides a helical honeycomb article (see U.S. Pat. No. 5,633,066, Lipp et al.).

Figure 6:
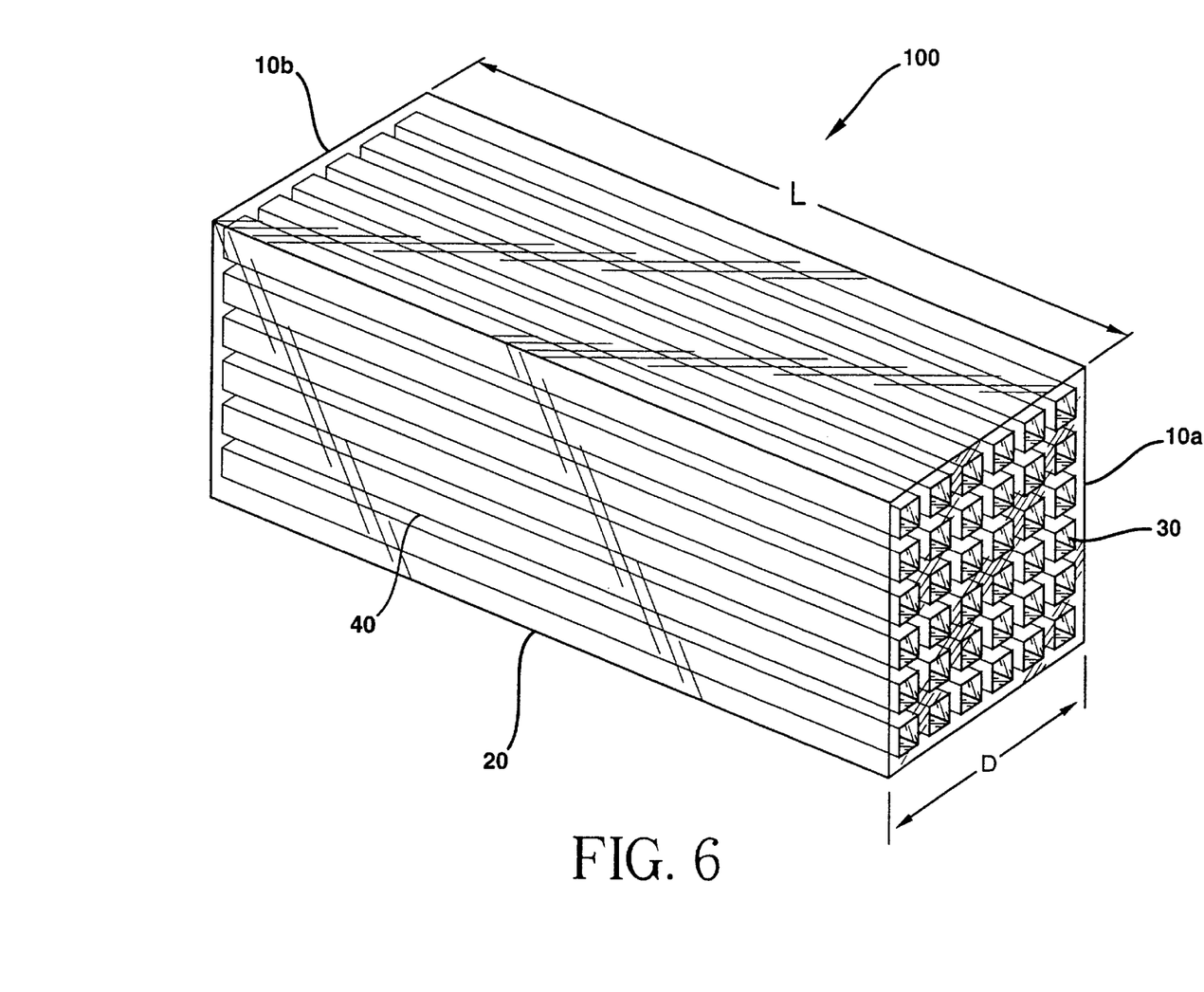
FIG. 6 is a schematic representation of sectioning the honeycomb glass article of FIG. 1 into a multitude of essentially identical, finite length honeycomb articles, wherein the longitudinal length is significantly longer than the cross-sectional width.
Figure 7:
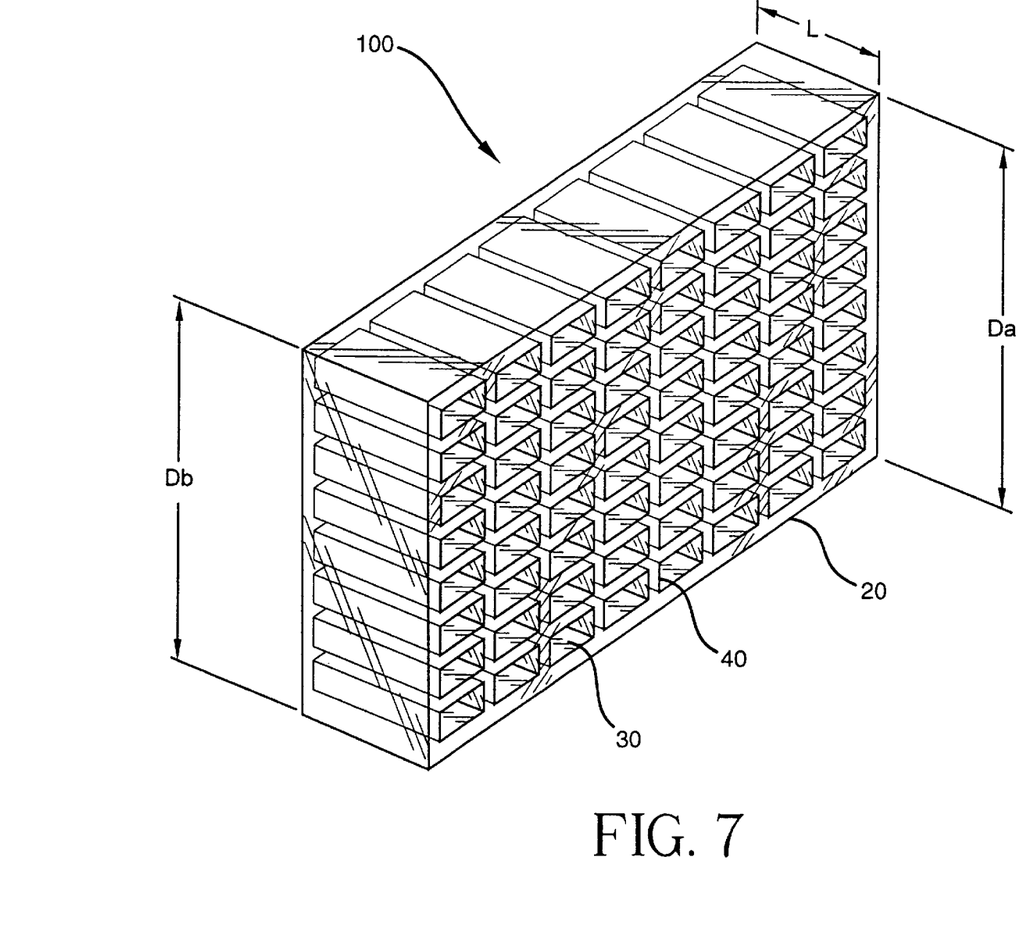
FIG. 7 is a schematic representation of the honeycomb glass article sectional being processed into a multitude of essentially identical, finite length honeycomb articles, wherein the longitudinal length is significantly shorter than the cross-section width.

In yet another embodiment of the invention, the glass honeycomb article can be sectioned along its longitudinal axis after optionally being redrawn. In one preferred embodiment, after cutting, the distance along the longitudinal axis is significantly greater than the cross-sectional diameter of the honeycomb. In this manner, a tube is created having multiple channels. In a second preferred embodiment, after cutting, the distance along the longitudinal axis is equal to or shorter than the cross-sectional diameter of the honeycomb, thus creating a honeycombed plate or screen article.

In still another embodiment of the invention, one or both ends of the honeycomb article can be capped or sealed with a capping material 50. This material can be composed of any known solid substance including, but not limited to, glass, metals, organic polymers and resins. These materials may be colored or colorless; opaque, translucent or transparent; and they may have any thickness. In another preferred embodiment, the thickness or the refractive index of the capping material is not uniform and is designed to function as a lens for focusing or diverging transmitted radiation. Furthermore, the capping material may be permeable to other materials such as liquids or gases.

The channels in any of the above-mentioned embodiments can be filled or partially filled or coated with a material. This material may be a solid, liquid, gas, or combinations thereof. Specifically contemplated is filling less than all channels.

The structure and cross-sectional shape of the hollow channels 30 depends on the die used during the extrusion process. It is within the scope of this invention that channel structures possess a cross-sectional shape defined by a closed wall 40. These shapes include, but are not limited to, circles, ellipses, regular polygons, and irregular polygons having acute or obtuse angles with equal or unequal sides. These shapes may or may not have a point or plane of symmetry. Preferred shapes include squares, triangles, hexagons, and circles. The hollow channels can be in a repetitive pattern within the article or randomly placed along the cross-sectional surface. It is within the scope of the invention that one or more shapes may be formed within the cross-sectional area of the honeycomb. Furthermore, the cross-sectional size of the channels need not be uniform throughout the honeycomb cross-section.

In one preferred embodiment, the channels would decrease in size as the distance increases from the center of the cross-sectioned honeycomb.

The thickness, t, of the walls separating the channels can be constant from one channel to another, or they may vary in thickness between one channel and another. Depending on the application of the honeycomb article, either design is acceptable.

Typical characteristics of the extruded unsintered glass honeycomb article prior to redrawing are, for example:

commercial cell density (CD) range: 16–900 cells per square inch;

commercial open frontal area (OFA) range: 0.55–0.87;

commercial substrate diameter (D) range: 0.25–12 inches;

commercial channel wall thickness (t) that can be calculated from the equation:

$$OFA=((CD^{-0.5}-t)/CD^{-0.5})^2=(1-t(CD)^{0.5})^2.$$

The above ranges after firing change because of sintering shrinkage. Shrinkage depends on solids loading and the degree of sintering, but values between 13–20% isotropic linear shrinkage are typical.

Due to the unique combination of vitreous solid properties discussed supra and the flexibility of the paste-extrusion process, the resulting fused silica honeycomb can find many applications outlined hereinbelow.

Bio-reactor: Silica surface is known to be bio-active. The cells of the honeycomb structure can be used for culturing. It is also known that metabolism of certain microorganisms can be greatly enhanced with low intensity light radiation at certain wavelengths (mostly in the UV region). By feeding nutrient up-stream, while at the same time radiating the microorganism grown on the cell wall (by taking advantage of the high UV transmission of the HPFS), the transparent silica honeycomb structure can be used as a bio-reactor to generate useful bio-materials.

Capillay flow controller: Capillary tubes can restrict the flow of fluid passing through them. They can regulate the flow at a rather constant rate for multiple orifices. Either through cold reduction of green silica honeycomb structure (a process involving wax refill and reduction extrusion; see U.S. patent application Ser. no. 09/211,379, attorney docket number D-13569) followed by sintering, or through hot reduction by a hot drawn down, ultrahigh cell density with capillary channel can be achieved. The efficiency of this honeycomb capillary flow controller is maximized because of the ultra high packing density of the capillary channels. Excellent chemical and thermal stability of the high purity silica is advantageous for such an application.

High efficiency filtration system: Partially sintered silica particle compact has a 3-D interconnecting pore structure. Due to the small size and narrow size distribution of the soot particle, the resulting microstructure will consist of a 3-D porous network with passage in the middle to upper nanometer range and narrow range and narrow size distribution. This is ideal for ultrafiltration applications. With viscous sintering being the dominant mechanism, the size of the porous passage can be well controlled by heat treatment temperatures between 1050–1400° C. without sacrificing porosity. As a result, the partially sintered silica honeycomb structure with controlled porous passage can be used for filtration by selective channeling through the honeycomb cells. High operating efficiency comes from the unique combination of high cell density, thin cell wall, sharp passage cut-off, and high porosity. Chemical and thermal stability of high purity silica is advantageous for such application.

Membrane reactor: Similar to the filtration system but differing in one respect, the membrane reactor is an active system. By loading catalyst into the 3-D porous network and selectively channeling different reactant fluid through the honeycomb cells, kinetics of the chemical reaction can be enhanced and equilibrium modified. As result, orders of magnitude increases in reaction rate and product yield can be achieved. Again, chemical and thermal stability of the silica is an added advantage.

In-situ water treatment: This application also utilizes the high UV transmission properties of HPFS. Hazardous bacteria and virus can be eliminated by flowing contaminated water through the honeycomb structure while applying high intensity Lw radiation from outside the honeycomb structure.

Microlens array: Infiltrate the HPFS honeycomb cell with molten glass of high refractive index, then immediately lower the temperature to the range where the reaction between the high refractive index glass and the HPFS (by diffusion mechanism) can be safely controlled. At an appropriate temperature with proper exposure times, it is possible to generate a unique glass body consisting of a periodic array of parallel columns. The refractive index (RI) profile within individual columns will be radially parabolic. The glass body can then be redrawn to reduce the size of these special index columns and the space between them. After being redrawn, the glass can be sliced into thin disks consisting of a microlens array. Selected lenses in the array can be masked to generate patterns.

Photonic band gap structure: It is possible to create an HPFS structure with a periodicity in micron size range through a single stage or two stage reduction process. The single stage approach increases cell density simply by hot redraw. The two stage approach starts with a cold reduction of green silica honeycomb structure (a process involving wax refill and reduction extrusion; see U.S. patent application Ser. No. 09/068,230, attorney docket number D-13569) followed by sintering, then finally through hot reduction by hot redraw. The orderly arrangement of two media (in this case, silica and air) with different RI gives rise to a photonic band gap as the periodicity approaches micron scale; see U.S. patent application Ser. No. 09/360,672, filed Jun. 30, 1998, attorney docket number D-13816. Patterned defects can be created by modifying the original honeycomb cell structure to produce interesting optical effects.

High temperature dielectric material: Many materials, including polyurethane foam, polystyrene foam, and foamed glass have been used as dielectric materials in applications such as specialty antennae and Lundberg lenses. For high energy density and high temperature applications, organic polymeric materials can no longer perform adequately. Different applications may require different dielectric constant profiles within the material. For example, the Lundberg lens require the profile of highest dielectric constant at the core and decreasing dielectric constant radially outward, with a concentric symmetry. The dielectric constant is controlled by altering the hollow structure of the material, a difficult task to achieve with precision in the foamed structure, especially for high melting glass. Alteration of the dielectric constant can be readily achieved by either of two designs. The first would provide ever larger cross-sections for the hollow channels, as the distance increases from the center of the antenna. The second design provides channels of all the same cross-section. The number of such channels per unit area would increase as the distance increases from the center of the lens.

The extrusion process for preparing honeycomb glass articles is suited for economically preparing such antennae and lenses with the added benefit that the composition profile can be manipulated through the feeding process to the extrusion die, in order to gain additional control over the dielectric profile. Profile manipulation is not feasible for foam structures.

Light weight structural support: The honeycomb glass device disclosed supra can also be used for a structural support, since the cellular design provides a sufficiently rigid and strong object to sustain large forces placed along the cellular axis. Although the honeycomb glass is physically durable and strong, it is also very light in weight. This makes it ideal for use as a structural support for massive objects, especially such articles as mirrors. Prior art designs for mirrors essentially utilized a glass member machined to a highly polished surface. The mirror, being essentially of solid bulk glass, was typically extremely heavy. Another conventional approach to creating a support was to fuse pieces of glass together into a light weight core. Both means are expensive and time consuming.

Figure 8:
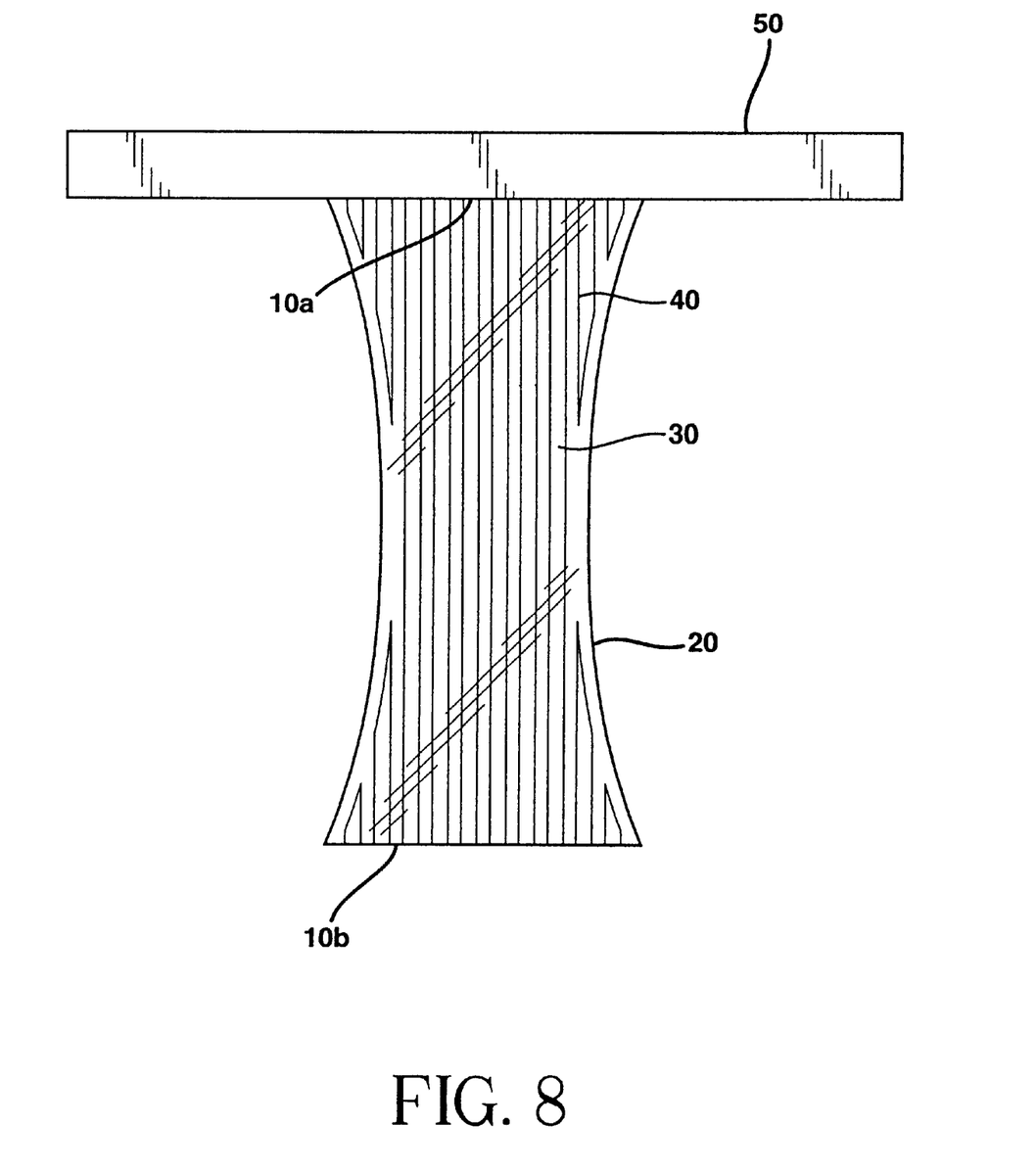
FIG. 8 schematically depicts a bellmouth lightweight glass honeycomb article wherein the frontal ends have a larger surface area than the columnar cross-sectional surface area and said frontal end supporting a weight-bearing member.

If such articles were meant for extraterrestrial destinations then the bulk weight of the article became a limiting factor in its design. The current invention allows for a very light weight support made of honeycomb glass. Affixed or capped to one end of the support would be the mirror element 50. Another feature of the design is that the coefficient of expansion for the support can be designed to be equal to that of the mirror element so that thermal changes would not cause distortions or physical cracking of the mirror element. For this reason, ceramic materials that previously could be manufactured in a honeycomb design were not useful, since their coefficient of expansion was very different from that of the glass mirror element. However, conventional extrusion techniques for ceramics can be modified to prepare the glass, light weight support as discussed above.

A mismatch in the coefficient of thermal expansion (CTE) between the mirror blank and the core results in permanent stresses between the components during the bonding operation. It is desirable to minimize the stresses to reduce or eliminate the likelihood of cracks or long term creep of the components. A second desirable reason for matching the CTE is to minimize distortion of the parts when temperature changes occur. Temperature changes may involve shifts by up to tens of degrees. Distortions occur because one component expands proportionately more or less than the second component. The distortion is undesirable and can be minimized by minimizing the CTE variation between the components. Mismatches of less than 60 ppb/° C. and preferably less than 15 ppb/° C. are achievable.

To address the issue of matching the thermal coefficient of expansion between the honeycomb article and a glass member, it is highly desirable to use a glass for the honeycomb article having a very low CTE. Such a glass is known and marketed by Corning Incorporated under the tradename ULE™. This silicate glass contains between about 6 to 8 wt % $TiO_2$ with a preferred content of about 7 wt % $TiO_2$. Contents outside of these values can be made in order to tailor the CTE to other desirable values as well.

In order to create light weight honeycomb structures the present invention is designed to limit the amount of glass in the honeycomb structure. This is achieved by minimizing the thickness of the walls of the channels and thereby maximizing the channel openings within the honeycomb structure. The extent to which this is achieved is defined by the equation that relates area of the openings (OA) to the area of the total cross-section (TCA) of the honeycomb. Therefore, the open frontal area (OFA) is equal to OA/TCA. In the current invention OFA up to 0.995 are achievable. Depending on the ultimate use values of 0.5 to 0.995 are preferred. For light-weight support structures 0.9 to 0.995 are preferred. As noted supra, typical commercial OFA values up to 0.87 are obtainable. To achieve values above 0.9 additional process steps may be required. For example, after sintering, either remove selected walls of the channels by machining (e.g., core drilling, water jet milling or by thinning the walls by grinding and polishing) or by chemical etching are useful techniques for increasing the OFA value. Other machining options should also work for those skilled in the art. It is also possible to chemically etch the channel walls to increase the OFA value. Another technique to increase OFA is found in U.S. Pat. No. 5,458,834 (Faber et al.) assigned to Corning Inc. for an extrusion osmotic drying technique.

It is another embodiment of the present invention to utilize multiple honeycomb articles for structural support of objects such as mirrors. It is expected that multiple honeycomb units would be used primarily when dimensions begin to exceed about 10 inch diameter. The multiple units can be separately placed and act as individual islands of support. Alternatively, the individual honeycomb units can be bonded together to form a larger single structural support.

Various means of bonding a mirrored surface or backing plate to the honeycomb structure exist (see U.S. Pat. No. 4,315,991, Hagy et al.) and include but are not limited to:

(1) glass to glass bonds at temperatures between 950° C. and 1600° C. This involves matching the contour of the honeycomb structure to the contour of the glass plate. Secondly, the two structures are heated together until fusion takes place between the two mated surfaces.

(2) machining the honeycomb structure to match the contour of the glass surfaces. However, in this second embodiment, a second material is placed between the two surfaces which on heating, will melt and form a bond between the honeycomb structure and the plate. Usual temperatures for this process are about 1100° C.

Especially where the both ends of the honeycomb article are being capped, the cell walls of the honeycomb support may require a gas channel to prevent the structure from undergoing large differential pressure gradients between the channels and the ambient atmosphere. Several means of introducing gas into the channel are contemplated as part of the present invention. Examples include, but are not limited to, (i) a structure which is not fired to complete density, thus having open connected porosity between channels, (ii) holes placed in the channels at any number of processing stages such as after extrusion but before firing or after firing etc., (iii) additional channel formers to the extrudable mix. Typical channel formers are starch or carbon black. These materials serve as inert material during the extrusion process, but would later be removed by combustion or oxidation.

In one preferred embodiment of the present invention an extruded honeycomb article is further processed to decrease its weight while still maintaining its ability to act as a structural support. In this embodiment, the original honeycomb article having initially a uniform circumference from one opposing end to the other, is fabricated to reduce the circumference at some point between the two opposing ends. In this manner the cross-sectional area of the opposing ends will be greater than that of the cross-sectional area at the longitudinal midpoint of the honeycomb support. For a cylindrical support, this would typically create a cylinder with a mid-longitudinal cross-section having a smaller circular area than the opposing faces; while for a honeycomb column having a square cross-section, this would create a mid-longitudinal cross-section in the shape of a rectangle (if two opposing sides are trimmed) or a square (if all sides are trimmed). In either case the cross-section area at the midpoint of the longitudinal axis will be smaller than the cross-sectional area of the opposing faces.

Articles of this type are manufactured by first extruding to generate an article with uniform cross-section. Subsequent removal of material from the central portion, while leaving intact material on the top and the bottom, is then achieved by mechanical or ablative means. The article so formed, must retain its ability to bear a load on at least one of its opposing faces. The designs of these structures will likely change with specific applications, however circular- and rectangular-shaped opposing faces are preferred. The upper face of the article is then bonded to the weight bearing load while the other face is used as a base to affix the weight bearing load and support to a frame or the like.

Since other modifications and changes varied to fit particular operating requirements and environments will be apparent to those skilled in the art, the invention is not considered limited to the examples chosen for purposes of disclosure, and the present invention covers all changes and modifications which do not constitute departures from the true spirit and scope of this invention.

Having thus described the invention, what is desired to be protected by Letters Patent is presented in the subsequently appended claims.

We claim:

1. A glass honeycomb article comprising high purity silicon dioxide and comprising first and second ends, an outer longitudinal surface, and channels traversing within said longitudinal surface, along a longitudinal axis, from said first end to said second end, said channels being separated from each other by longitudinal cell walls; having a thickness greater than 10 micron, said article prepared by an extrusion process utilizing high purity fused silica soot.

2. The glass honeycomb article recited in claim 1, further comprising up to 50% selected from the group consisting of phosphorous oxide, aluminum oxide, boron oxide, germanium oxide, lithium oxide, sodium oxide, magnesium oxide, potassium oxide, calcium oxide, and combinations thereof.

3. The glass honeycomb article recited in claim 1 wherein said channels comprise a cross-sectional shape defined by said walls.

4. The glass honeycomb article recited in claim 3 wherein said shape is selected from the group consisting of circles, ellipses, regular polygons, and irregular polygons having acute or obtuse angles or mixtures thereof.

5. The glass honeycomb article comprising silica glass recited in claim 1 wherein said channels have a cross-sectional diameter greater than about 0.8 mm.

6. The glass honeycomb article comprising silica glass recited in claim 1 wherein said walls have a thickness of at least about 40 micron.

7. The glass honeycomb article comprising silica glass recited in claim 1 wherein said first end has an open frontal area of about 70% to about 99.5%.

8. The glass honeycomb article recited in claim 1 wherein said channels are parallel to each other.

9. The glass honeycomb article recited in claim 1 wherein said channels are helically displaced from each other.

10. The glass honeycomb article recited in claim 1 wherein said first end cross-section area and said second end cross-section area are equal.

11. The glass honeycomb article recited in claim 1 wherein said first end cross-section area and said second end cross-section area are unequal.

12. The glass honeycomb article recited in claim 1 wherein said glass honeycomb article has a U-shape.

13. The glass honeycomb article recited in claim 11 wherein said honeycomb article has a U-shape.

14. The glass honeycomb article recited in claim 1 wherein at least said one end is capped.

15. The glass honeycomb article recited in claim 1 wherein the cross-sectional diameter of said article is no greater than the length of said longitudinal axis.

16. The glass honeycomb article recited in claim 1 wherein the cross-sectional diameter of said article is greater than the length of said longitudinal axis.

17. The glass honeycomb article recited in claim 1 wherein said glass is transparent to visible light.

18. The glass honeycomb article recited in claim 1 wherein said glass is transparent to ultraviolet radiation comprising wavelength from about 180 nm to about 300nm.

19. The glass honeycomb article recited in claim 1, wherein said outer longitudinal surface comprises a toroid, and wherein the area of any cross-sectional slice along said longitudinal axis is greatest at said first and second ends.

20. The use of the glass honeycomb article as recited in claim 1 as a bio-reactor.

21. The use of the glass honeycomb article as recited in claim 1 as a high efficiency filtration system.

22. The use of the glass honeycomb article as recited in claim 1 as a capillary flow controller.

23. The use of the glass honeycomb article as recited in claim 1 as a membrane reactor.

24. The use of the glass honeycomb article as recited in claim 1 for in-situ water treatment.

25. The use of the glass honeycomb article as recited in claim 1 as a microlens array.

26. The use of the glass honeycomb article as recited in claim 1 as a photonic band structure.

27. The use of the glass honeycomb article as recited in claim 1 as a high temperature dielectric material.

28. The use of the glass honeycomb article as recited in claim 1 as a lightweight structural support.

* * * * *